United States Patent
Becker et al.

(10) Patent No.: US 9,984,766 B1
(45) Date of Patent: May 29, 2018

(54) MEMORY PROTECTION CIRCUITRY TESTING AND MEMORY SCRUBBING USING MEMORY BUILT-IN SELF-TEST

(71) Applicant: ARM Limited, Cambridge (GB)

(72) Inventors: Alan Jeremy Becker, Bushey (GB); Peter Logan Harrod, Cambridge (GB)

(73) Assignee: ARM Limited, Cambridge (GB)

( * ) Notice: Subject to any disclaimer, the term of this patent is extended or adjusted under 35 U.S.C. 154(b) by 0 days. days.

(21) Appl. No.: 15/467,042

(22) Filed: Mar. 23, 2017

(51) Int. Cl.
*G11C 29/12* (2006.01)
*G01R 31/3187* (2006.01)
*G06F 11/08* (2006.01)
*G06F 12/14* (2006.01)

(52) U.S. Cl.
CPC .......... *G11C 29/12* (2013.01); *G01R 31/3187* (2013.01); *G06F 11/08* (2013.01); *G06F 12/1433* (2013.01); *G06F 2212/1052* (2013.01)

(58) Field of Classification Search
CPC .......... G11C 2029/0411; G11C 29/021; G11C 29/10; G11C 29/44
See application file for complete search history.

(56) References Cited

U.S. PATENT DOCUMENTS

| | | | | |
|---|---|---|---|---|
| 4,150,326 A | * | 4/1979 | Engelberger | G05B 19/4062 318/563 |
| 9,432,298 B1 | * | 8/2016 | Smith | H04L 49/9057 |
| 2007/0226551 A1 | * | 9/2007 | Janke | G06F 11/1004 714/703 |
| 2008/0126893 A1 | * | 5/2008 | Harrand | G11C 7/04 714/719 |
| 2014/0040692 A1 | * | 2/2014 | Shah | G06F 11/24 714/736 |
| 2017/0010639 A1 | * | 1/2017 | Matsumoto | G06F 1/183 |

* cited by examiner

*Primary Examiner* — Tuan T Nguyen
(74) *Attorney, Agent, or Firm* — Nixon & Vanderhye P.C.

(57) ABSTRACT

A data processing apparatus includes a memory and memory protection circuitry for providing an operational path to the memory during operational use of the memory. A memory built-in self-test controller 34 performs built-in self-test operations upon the memory using either an indirect test access path to the memory via the memory protection circuitry or a direct test access path to the memory which bypasses the memory protection circuitry. Thus, the correct operation of the memory protection circuitry itself can be tested in addition to the correct operation of the memory.

20 Claims, 7 Drawing Sheets

MEMORY PROTECTION CIRCUITRY TESTING AND MEMORY SCRUBBING USING MEMORY BUILT-IN SELF-TEST

BACKGROUND

Field

This disclosure relates to the field of data processing systems. More particularly, this disclosure relates to in-field testing of memory protection circuitry and memory scrubbing within a data processing system using memory built-in self-test circuitry.

Description

It is known to provide a data processing apparatus (such as a so-called System on Chip (SoC) device) with one or more memories of a variety of different forms for storing data values to be manipulated and program instructions for specifying data processing operations to be performed. The data processing operations may be performed by a so-called IP core (a separately licensable block of processing operations implementable as logic circuitry) such as a CPU (central processing unit). The forms of memory may include, for example, main memories, cache memories (including, for example, level 1 (L1) caches, level 2 (L2) caches and the like), translation lookaside buffers for storing data specifying virtual-to-physical memory address translations and/or memory permission data, and memories storing data for other uses within the data processing system, such as branch history data used for branch prediction.

It is known to provide memory built-in self-test (MBIST) circuitry within data processing systems for performing memory test operations upon memories within data processing systems. Such memory built-in self-test circuitry may be used to perform initial testing upon initial manufacture of a data processing system and/or ongoing testing during the life of the data processing system. Identifying an error in the operation of a memory can be used to trigger an appropriate response, such as taking the relevant portion of the memory out of use such that it is not able to corrupt or slow the operation of the system as a whole. Many other different forms of response to a detected error are also possible.

It is also known within data processing systems to provide memory protection circuitry which serves to protect against errors in the memory during operational use of the memory. For example, error correction code circuitry and/or parity code circuitry may be used to store error correction codes and/or parity bits associated with stored data values within the memory. These error correction codes and/or parity bits may then be used to detect errors arising within the memory and potentially correct those errors. A soft error due to a particle strike may be detected and corrected before it is able to corrupt the operation of a system as a whole and since such an error is not symptomatic of a permanent fault within the memory, the memory can thereafter continue with its normal operation. The term "memory protection circuitry" can include memory error check or correction code generation, error detection and error correction circuits. These include parity and error correction code (ECC) circuits.

Testing of the memory protection circuitry itself may be performed in-field (which is to say, in the context of an operational device, rather than at a manufacture stage) at power-up, power-down or periodically during operation.

Three possible use models for in-field MBIST can be classified as: production test, off-line test and on-line test. Any of these use models may be used to test the memory protection circuitry at power-up, power-down or periodically during operation. There are trade-offs in terms of the complexity of the MBIST circuitry to support each of these use models against the invasiveness of the testing with respect to the functional operation performed by an IP core.

Production Test

In the production test use model all functional operation of an IP core is halted for the duration of the testing, the data in the memories is corrupted by the testing, all state is lost in the IP core and no accesses are made to the memories within the IP core other than by the MBIST circuitry. When testing is completed the IP core is reset and most memories within the core are initialized. Memory testing is performed in-field in a similar fashion to how it would be done when a device such as an SoC is manufactured. Typically the production test algorithms can take a long time to run, resulting in an IP core being unavailable for functional use for a relatively long period of time.

Off-Line Test

In the off-line test use model the memory to be tested is disabled by software running on an IP core and so it is not available for normal functional use. The IP core can still function but at a reduced performance level. For example if an L1 data cache is taken off-line a CPU can still access data in an L2 cache or lower memory, but each access may take longer than accessing the L1 data cache. Also, it may still be able to access the L1 instruction cache when the L1 data cache is taken off-line. If data within the L1 data cache needs to be preserved for use after testing, then any dirty data will have to be cleaned to a lower level memory before testing commences.

No accesses are made to the memory being tested other than by the MBIST circuitry. The contents of the memory being tested are normally corrupted by the testing and this memory may need to be initialized when it is enabled for functional use again. Typically, production test algorithms are used to test the memory. The state of the IP core is not lost as a result of the testing and it does not need to be reset after testing is complete.

On-Line Test

In the on-line test methodology all or part of a memory to be tested is locked by an MBIST controller and only a small portion of this memory is tested at a time, using a short burst on-line memory test algorithm. So the time that the memory is unavailable for functional use is very short. If an IP core wishes to access a memory entry that is locked for testing then the functional access is stalled until the lock is removed by the MBIST controller. An IP core is still free to access all other memories and entries that are not locked for testing. Other parts of an IP core may still function normally even though an access to a particular memory is stalled. Any values in memory entries that are modified during testing are saved at the beginning of a test and restored at the end of a test by the MBIST controller. Testing is carried out autonomously to the normal operation of an IP core and the memory being tested does not need to be disabled for functional use. The state of the IP core is not lost as a result of the testing and it does not need to be reset after testing is complete.

Testing has little or no effect on the operation or performance of an IP core because the core may not need to access the locked entries during a test burst or may attempt to access a locked memory part way through a test burst, the memory contents are preserved, coherency with other shared memories is maintained, testing is very short and the gap between tests is large.

Memory scrubbing is used to mitigate against multiple soft errors occurring in the same memory entry from multiple event upsets by checking and (if necessary) correcting stored data values. The current practice is that memory protection circuits support single bit error correction and double bit error detection. So if a memory entry contains two or more bits with an error then it is not possible to correct these errors and so the data is lost. A memory entry may not be read for a long period of time and so it may contain a soft error that is undetected and so is vulnerable to a second soft error event which could irrevocably corrupt the data. Hence, it can be appropriate to perform memory scrubbing to correct soft errors soon after they occur.

SUMMARY

At least some embodiments of the present disclosure provide apparatus for processing data comprising:
a memory;
memory protection circuitry to provide an operational access path to said memory and protection against errors in said memory during operational use of said memory; and
memory built-in self-test circuitry to perform test operations upon said memory;
wherein said memory built-in self-test circuitry provides an indirect test access path to said memory via said memory protection circuitry and a direct test access path to said memory by-passing said memory protection circuitry.

At least some embodiments of the present disclosure provide a method of built-in self-testing a memory having memory protection circuitry providing an operational access path to said memory and protection against errors in said memory during operational use of said memory, said method comprising:
accessing said memory using an indirect test access path to said memory via said memory protection circuitry; and
accessing said memory using a direct test access path to said memory by-passing said memory protection circuitry.

At least some embodiments of the disclosure provide memory built-in self-test apparatus for built-in self-testing a memory having memory protection circuitry providing an operational access path to said memory and protection against errors in said memory during operational use of said memory, said memory built-in self-test apparatus comprising:
memory interface circuitry to provide an indirect test access path to said memory via said memory protection circuitry and a direct test access path to said memory by-passing said memory protection circuitry.

The above, and other objects, features and advantages of this disclosure will be apparent from the following detailed description of illustrative embodiments which is to be read in connection with the accompanying drawings.

DRAWINGS

FIG. 1 schematically illustrates a data processing system including multiple memories of different types with some of these memories incorporating memory protection circuitry and some having associated memory built-in self-test circuitry;

FIG. 2 schematically illustrates memory built-in self-test circuitry connected to a memory and to both write-side memory protection circuitry and read-side memory protection circuitry;

EMBODIMENTS

Example arrangements can provide apparatus for processing data comprising:
a memory;
memory protection circuitry to provide an operational access path to said memory and protection against errors in said memory during operational use of said memory; and
memory built-in self-test circuitry to perform test operations upon said memory;
wherein said memory built-in self-test circuitry provides an indirect test access path to said memory via said memory protection circuitry and a direct test access path to said memory by-passing said memory protection circuitry.

In example embodiments, additional circuitry in an IP core required to support testing of memory protection circuitry can also be used by an MBIST controller for memory scrubbing.

Memory scrubbing can similarly be achieved using examples of the present techniques by an MBIST controller and the features already used for testing memory protection circuitry.

Example arrangements can potentially be low cost and have little or no effect on power, performance (functional circuit timing) and area (collectively, so-called "PPA" criteria) because they can make use of MBIST interfaces and MBIST circuitry within an IP core and the MBIST controller that are already used for memory testing, with a small amount of additional circuitry to allow testing of the memory protection circuitry. The memory built-in self-test use models supported by an IP core may also be employed for use in testing the memory protection circuitry. Also the memory is used to capture the values from and provide data values to the memory protection circuitry as would occur in normal functional operation.

Figure 1:
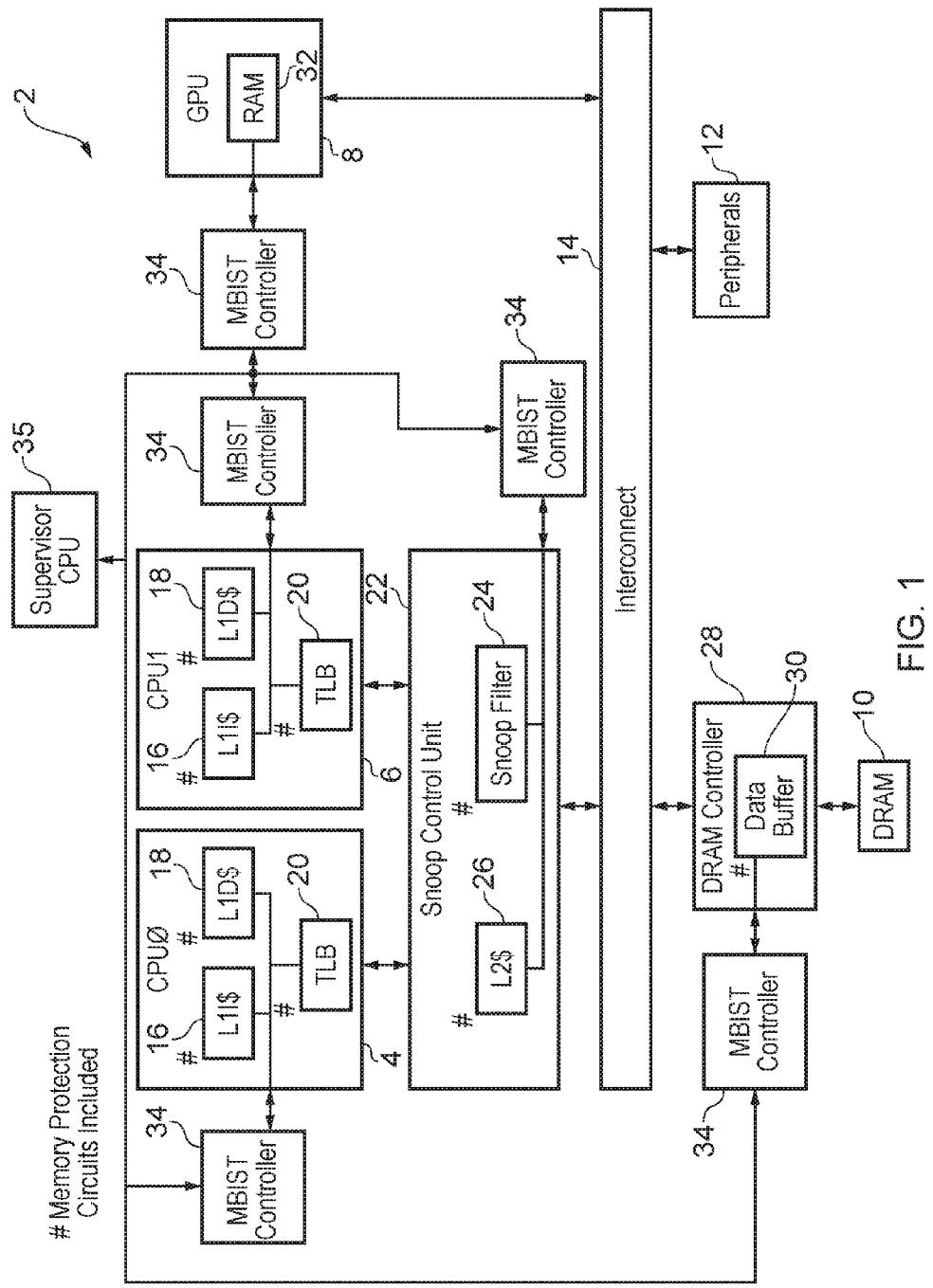

Turning now to the drawings, FIG. 1 schematically illustrates a data processing system 2, such as a system-on-chip integrated circuit, including a first processor core 4, a second processor core 6, a graphics processing unit 8, a main memory 10 and one or more peripherals 12 all connected via an interconnect 14. The first processor core 4 and the second processor core 6 each respectively contain a level one instruction cache 16, a level one data cache 18 and a translation lookaside buffer 20. In order to maintain coherency between the data cache within the first processor core 4 and the second processor core 6, a snoop control unit 22 serves to initiate snoop operations and coherency control utilizing, amongst other circuits, a snoop filter 24. The snoop control unit 22 also includes a level two cache 26 which is shared by the first processor core 4 and the second processor core 6. A DRAM controller 28 is disposed between the interconnect 14 and the main memory (DRAM) 10. The DRAM controller 28 includes a data buffer 30 for buffering data accessed within the main memory 10, such as providing buffer storage for multiple lines of data most recently accessed within the main memory 10. The graphics processing unit 8 includes a random access memory 32 used for graphics processing operations performed by the graphics processing unit 8.

As indicated by the "#" marker in FIG. 1, a variety of the different memories 16, 18, 20, 24, 26, 30 within the data processing system 2 of FIG. 1 are provided with memory protection circuitry. The graphics processing unit 8 memory 32 in the example system as drawn does not have memory protection circuitry, but it may be present in this or other graphics processor units. This memory protection circuitry may take a variety of different forms, such as circuitry to generate a parity value and/or an error correction code value associated with a data value (which includes both data values to be manipulated and instructions) stored within a respective memory. The parity value and/or error correction code value may be generated by the memory protection circuitry as the data value is written into the memory and then read and checked by the memory protection circuitry as the data value is read from the memory. In this way, errors within the operation of the memory may be detected and potentially corrected (if not too severe). It will be appreciated that there are many different ways in which the memory protection circuitry may operate and there is generally a trade-off between the overhead associated with the processing and storage of parity and/or error correction codes weighed against the degree of error protection and error correction ability which they provide. It is also possible that data may be accessed within a given memory in a form in which the bit values accessed represent multiple data values each having separate associated parity and/or error correction codes, e.g. 128 bits of data may be accessed together and represent two 64-bit data words each with separate parity and/or error correction codes.

The memories 16, 18, 20, 24, 26, 30, 32 within FIG. 1 each have an associated memory built-in self-test controller 34 (as an example of memory built-in test circuitry) which serves to perform memory built-in self-test operations upon their respective memories under control of a supervisor processor 35. Note that it is not necessary to use a separate supervisor processor; the role and functionality of a supervisor processor could be provided by another (or more than one other) processor in the apparatus, alongside the other role(s) and functionality of the one or more other processors.

An individual memory built-in self-test controller 34 may be dedicated to performing built-in self-test operations upon an individual memory (e.g. in the case of the RAM memory 32 within the graphics processing unit 8) or may be shared between multiple memories (e.g. in the case of the level one instruction cache 16, the level one data cache 18 and the translation lookaside buffer 20 within the first processor 4).

Each memory may consist of multiple sub-memories (e.g. a cache may contain a tag RAM and a data RAM and each of these RAMs may be sub-divided into multiple ways or banks). Each sub-memory may have its own memory protection logic. Multiple MBIST controllers, 34, may be performing tests at the same time and so memories in different IP cores 4, 6, 8, 22, 28 may be tested in parallel.

When the supervisor processor 35 instructs one of the instances of the memory built-in self-test controller 34 to perform a built-in self-test operation upon one of its respective associated memories, the memory built-in self-test controller 34 acts to reserve one or more entries (represented by memory addresses) within the memory to be tested. If the associated processing circuitry 4, 6, 8, 22, 28 wishes to make use of those memory locations whilst they are reserved, then the processing circuitry is stalled until the built-in self-test operations have completed and the memory locations are released. This describes an on-line testing use model as discussed above. A production testing use model (in which an entire device's operation is unavailable for the duration of the test) or an off-line testing use model (in which a particular memory is made unavailable for the duration of the test, with operations otherwise continuing without the use of that disabled memory), both as discussed above, may also be used.

The testing can be arranged so as to have little effect on the operations of the processor, as discussed above. Over an extended period of time, the supervisor processor 35 instructs built-in self-test operations to be performed which eventually cover all of the storage locations within a given memory so as to check the correct operation of the full memory. This mode of testing permits ongoing built-in self-test operations to be performed while the data processing system 2 is in field use and performing its functional processing operations.

Figure 2:
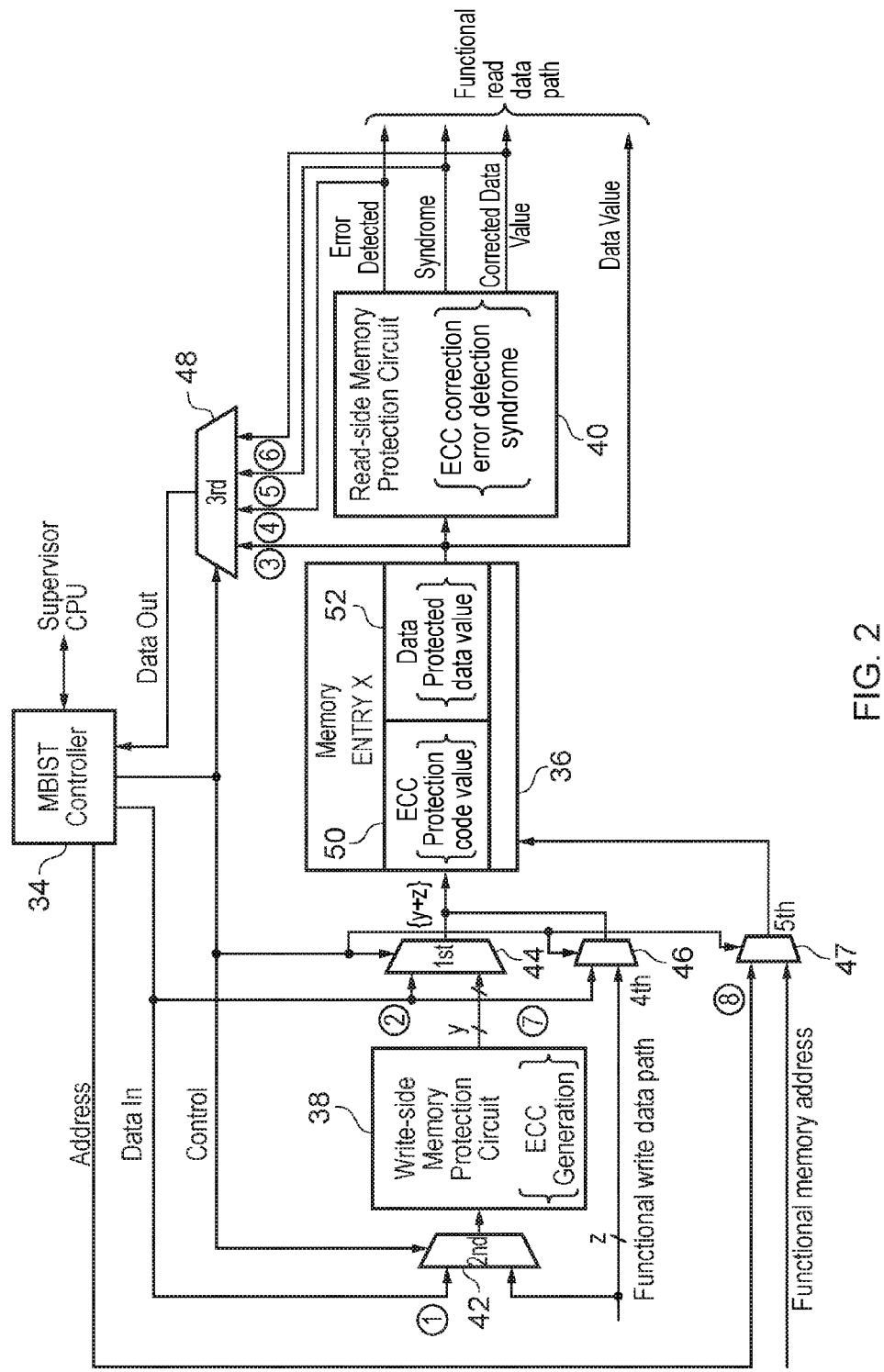

FIG. 2 schematically illustrates a memory built-in self-test controller 34 connected to a memory 36 (which may, for example, be one of the memories 16, 18, 20, 24, 26, 30 of FIG. 1) which is provided with memory protection circuitry in the form of write-side memory protection circuitry 38 and read-side memory protection circuitry 40. In this example embodiment, the write-side memory protection circuitry 38 serves to generate error correction codes 50 in dependence upon data values 52 stored into the memory 36. The error correction code (ECC) comprises a protection code value and the data value stored comprises a protected data value 52. The data bus from the MBIST controller may for example be wide enough to carry data and ECC values. More particularly, during normal functional operation of the memory 36 a data value z to be written into the memory 36 is supplied both to the memory 36 via a fourth multiplexer 46 as well as to the write-side memory protection circuitry 38 via a second multiplexer 42. The write-side memory protection circuitry 38 generates a protection code value y from the protected data value z such that this may be stored into the memory 36 via the first multiplexer 44 in association with the protected data value z via the fourth multiplexer 46. So, a memory entry X comprises (at least) an ECC protection code value 50 and a corresponding protected data value 52. During normal functional operation the functional memory address for read and write accesses is provided to the memory 36 via the fifth multiplexer 47. In a normal write operation, y and z are written together.

In functional (non-test) use the read-side memory protection circuitry 40 reads both the protected data value 52 and the protection code value 50 for an entry within the memory 36 and processes the protection code value 50 and the protected data value 52 together to detect any error therein and, if necessary, attempt correction of that error. The functional read data path from the read-side memory protection circuitry 40 comprises a corrected data path (the protected data value 52 subject to any correction necessary and possible), a syndrome value indicative of one or more bit positions within the protected data value 52 at which an error was detected by the read-side memory protection circuitry 40, and an error detected value indicating that the read-side memory protection circuitry 40 detected an error within the protected data value 52 and the protection code value 50.

The first multiplexer 44 and the second multiplexer 42 together serve to provide both an indirect test access path "1" and a direct test access path "2" to the memory 36 for the protection code value y 50 portion of the data written to the memory 36. The indirect path "1" passes via the write-side memory protection circuitry 38 and the direct path "2" by-passes the write-side memory protection circuitry 38.

During testing the MBIST controller 34 provides the protected data value z to the memory 36 for write accesses via the direct test access path "7", using the fourth multiplexer 46. Hence, for write accesses to the memory 36 during testing either:

the protection code value y and the protected data value z are both provided by the MBIST controller 34 at the same time using paths "2" and "7", or the protection code value y is provided by the write-side memory protection circuitry 38 and the protected data value z is provided by the MBIST controller 34 using paths "1" and "7". Note, the values provided by the MBIST controller 34 to paths "1" and "7" are identical.

This is achievable because the first and fourth multiplexers are independently controllable. Direct paths "2" and "7" permit the memory built-in self-test controller 34 directly to write both a protection code value 50 and a protected data value 52 to the memory 36 independent of the operation of the write-side memory protection circuitry 38. This facilitates, for example, simulation of errors within the protection code value 50 and the protected data value 52 in a manner whereby the correct operation of the read-side memory protection circuitry 40 in detecting and/or correcting those errors may be tested.

During testing the MBIST controller 34 provides the address used for read or write access to the memory 36 via the direct test access path "8", using the fifth multiplexer 47.

A third multiplexer 48 serves to select for connection to the memory built-in self-test controller 34 one or more of a number of different read outputs (paths). A read path "3" provides a direct path to permit reading of the protection code value 50 and the protected data value 52 from the memory 36 by-passing operation of the read-side memory protection circuitry 40. The read path "4" permits the error detected value generated by the read-side memory protection circuitry 40 to be read. The read path "5" permits the syndrome value generated by the read-side memory protection circuitry 40 to be read. The read path "6" permits the corrected data value generated by the read-side memory protection circuitry 40 to be read.

Thus, the third multiplexer 48 provides both a direct path "3" for the memory built-in self-test controller 34 to read the protection code and protected data values stored in the memory 36 and indirect paths "4", "5", "6" to read the memory 36 via the read-side memory protection circuitry 40. This permits, for example, the correct operation of the write-side memory protection circuitry 38 in generating appropriate protection code values 50 for given protected data values to be tested.

Note that the paths "2", "7", "8" and "3" are also used by MBIST operations to test the memory itself.

The provision of both the direct test access path and the indirect test access path which respectively include or bypass the memory protection circuitry 38, 40 permits test operations to be performed including test operations which test the correct operation of the memory protection circuitry 38, 40 itself.

Note, with application to all memory protection circuit tests described here, that (a) any memory (e.g. RAM) entry may be used for the testing; (b) if a failure is detected the RAM entries used in a test must be tested to check that the failure was not due to a hard or soft error in the entries themselves; and (c) the tests may be repeated with different data values in order to fully tests all bits of the memory protection circuitry.

FIGS. 1 and 2 therefore provide examples of apparatus 2 for processing data comprising: a memory (36); memory protection circuitry (such as 38, 40) to provide an operational access path to said memory and protection against errors in said memory during operational use of said memory; and memory built-in self-test circuitry (34) to perform test operations upon said memory; wherein said memory built-in self-test circuitry provides, for the protection code value, an indirect test access path ("1") to said memory via said memory protection circuitry and a direct test access path ("2") to said memory by-passing said memory protection circuitry. The MBIST controller 34 and associated circuitry can provide an example of memory built-in self-test apparatus for built-in self-testing a memory having memory protection circuitry providing an operational access path to said memory and protection against errors in said memory during operational use of said memory, said memory built-in self-test apparatus comprising: memory interface circuitry to provide an indirect test access path to said memory via said memory protection circuitry and a direct test access path to said memory by-passing said memory protection circuitry.

Before the test process is started the supervisor processor 35 programs the MBIST controller 34 that is used to test the target memory and associated memory protection circuit. This programming includes providing information about the memory to be accessed (e.g. an MBIST array identifier (ID)), one or more test data patterns, expected read data and operations to be performed as described below. Then the supervisor processor 34 instructs the MBIST controller 34 to carry out the memory protection circuit test. When the test is complete the supervisor processor 35 may access the MBIST controller 34 to obtain the result of the test and take appropriate action if the test fails. An MBIST controller 34 is used to perform the testing because it can test the memory protection circuits at a full functional speed using contiguous (back to back) operations. In example arrangements, test patterns are provided that rapidly toggle the data bits because the effects of aging can cause the operation of a circuit to slow down, causing it to malfunction in a similar way to a hard failure. This also allows the test to be performed quickly and so a memory may be reserved for testing for the least amount of time as possible, which is important for use in the on-line MBIST methodology.

Figure 3:
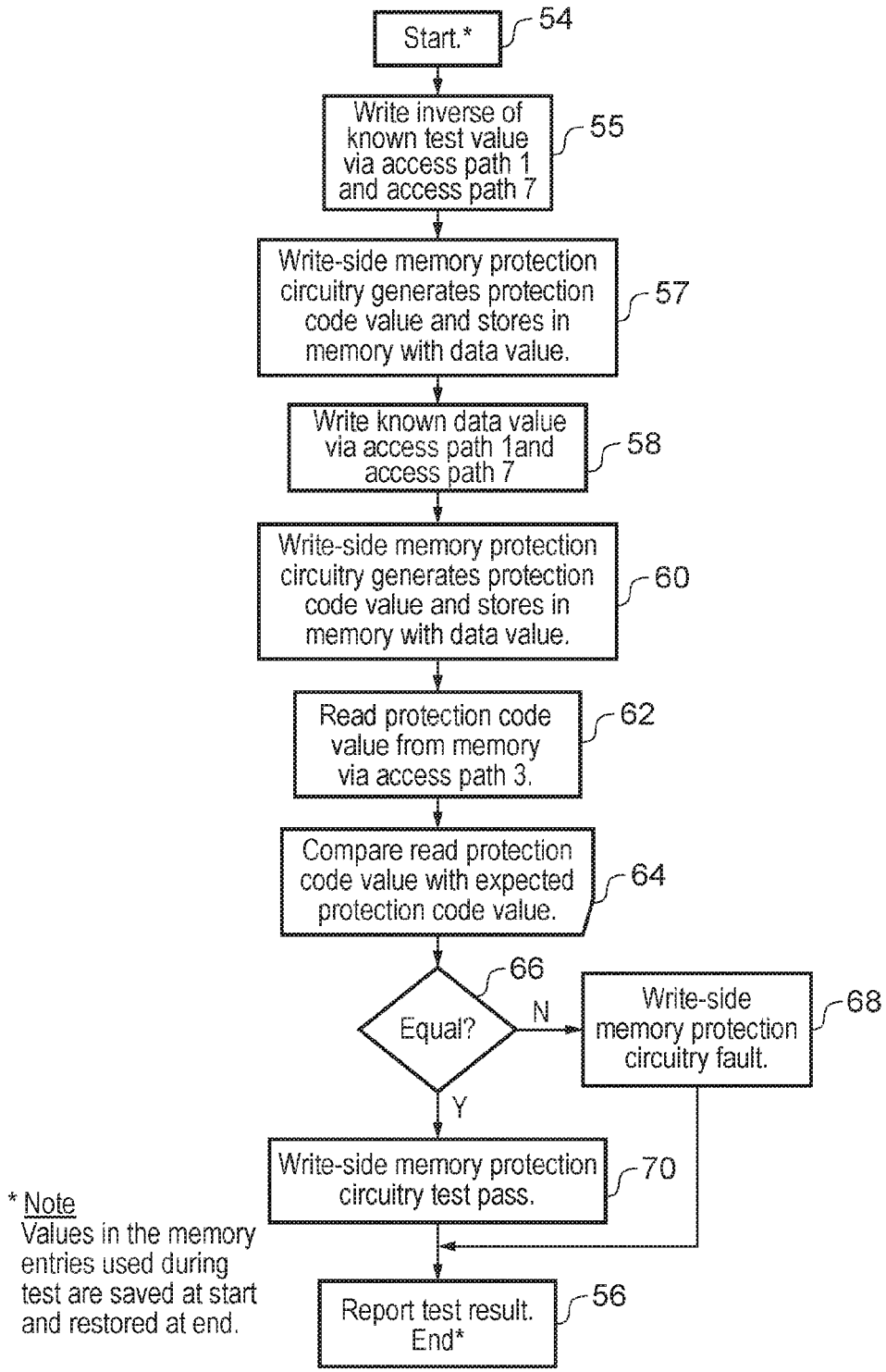
FIG. 3 is a flow diagram schematically illustrating a write-side memory protection test, for example for detecting faults in parity or error detection/correction code generation circuitry.

FIG. 3 is a flow diagram schematically illustrating a write-side memory protection test for testing the correct operation of the write-side memory protection circuitry 38.

At the start of the process at step 54 the value in a memory entry to be tested may be saved by the MBIST controller 34 so that it may be restored at the end of the test at step 56. This save and restore operation may also be performed in relation to each of the other forms of example tests described herein.

The test uses a known test data value and its inverse, to rapidly stimulate the write side memory protection circuitry with different values. Each value is applied by the MBIST controller 34 back to back. Two unrelated data values could also be used.

At step 55, the inverse of a known test data value is written into the memory 36 via path "1" and path "7". At step 57 the write-side memory protection circuitry 38 generates a protection code value 50 and stores this into the memory 36 together with the protected data value 52.

At step 58, a known test data value is written into the memory 36 via path "1" and path "7". At step 60 the write-side memory protection circuitry 38 generates a protection code value 50 and stores this into the memory 36 together with the protected data value 52. At step 62 the MBIST controller 34 serves to read the protection code value 50 from the memory 36 via path "3" and stores it in one of its data registers. Thus, the write into the memory 36 at steps 58 and 60 both use the indirect protection code path "1" and direct protected data path "7" and the read from the memory 36 at step 62 is via the direct path "3".

At step 64 the protection code value read at step 62 is read from an MBIST controller 34 data register by the supervisor processor 35 and is compared with an expected protection code value determined by the supervisor processor 35. Step 66 determines whether these are equal. If the read protection code value is not the same as the expected protection code value, then processing proceeds to step 68 where actions consequence upon a write-side memory protection circuitry fault are performed. If the read protection code value is equal to the expected protection code value, then processing proceeds to step 70 where write-side memory protection circuitry test pass operations are performed. At step 56 the test result is reported and the test option finished (including any restore of the original saved value from the memory location under test within the memory 36).

Figure 4:
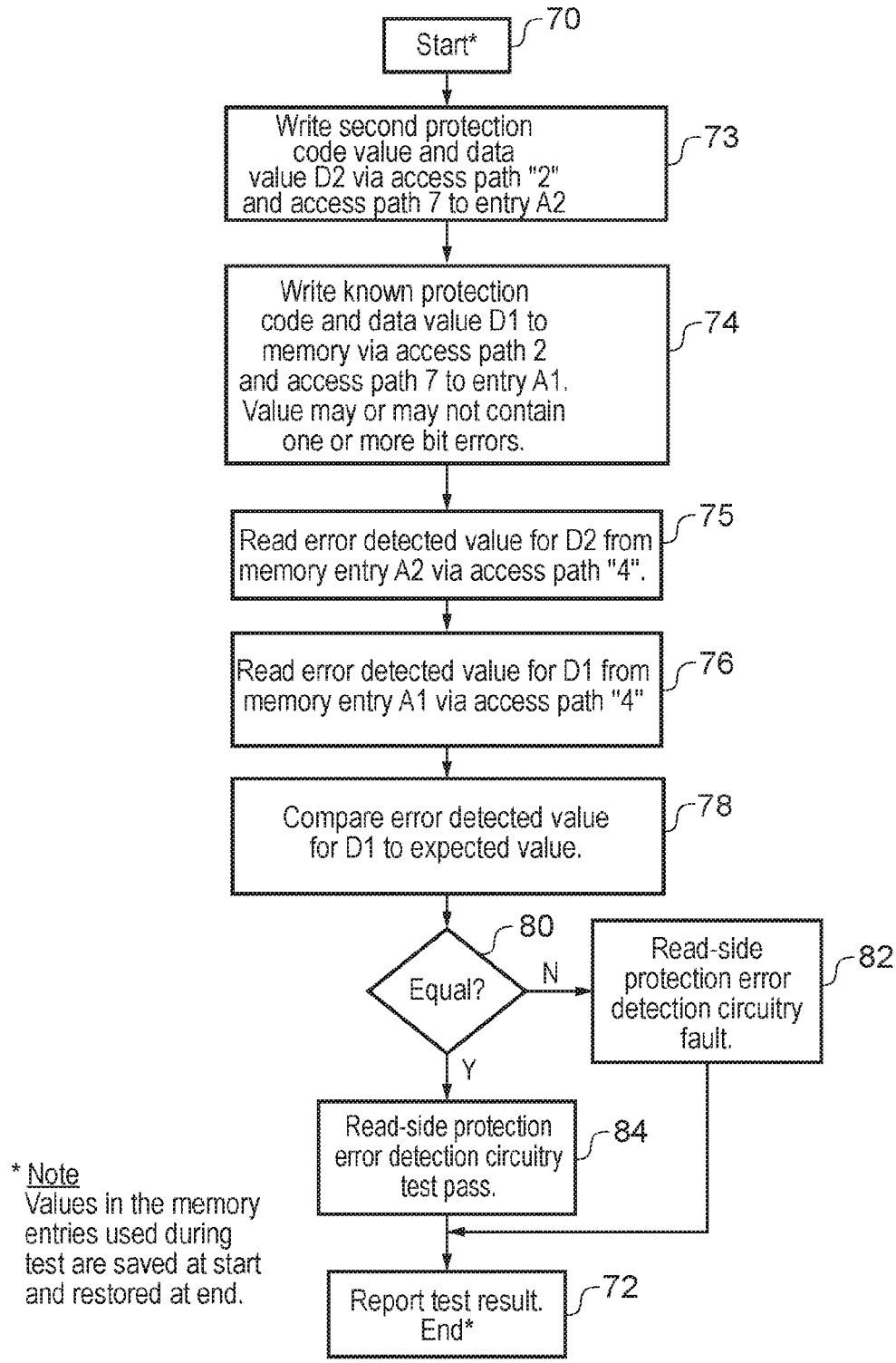
FIG. 4 is a flow diagram schematically illustrating a read-side memory protection test for detecting faults in error detection circuitry.

FIG. 4 schematically illustrates a read-side memory protection test for testing for correct generation of the error detected value. This value could indicate, for example, if the contents of a memory entry contain no error, a correctable error or non-correctable error.

The test uses a known test data value D1 and another (second) value D2 (possibly derived from the first value D1 but with one or more inverted bits relative to the first value D1), to rapidly stimulate the read-side memory protection circuitry with different values. One value contains an error and the other does not. For example, the value D1 may contain an error. Each value D1, D2 is written to a different entry (A1 or A2) then read, back to back by the MBIST controller 34. Hence, each value stimulates a different response from the error detection circuitry.

At step 70 the test starts (with the necessary save of the original data values of the entries used by the test such that they can be restored at the end of the test at step 72).

At step 73 the second protection code value 52 and data value 50 D2 are written to memory 36 entry A2 via path "2" (the direct protection code value path for write access to the memory 36) and path "7".

At step 74 a known protection code value 52 and data value 50 D1 are written to memory 36 entry A1 via path "2" (the direct protection code value path for write access to the memory 36) and path "7". The value written for the protection code value and the data value may or may not indicate an error in these values depending upon whether it is desired to test for either false positives or false negatives within the read-side memory protection circuitry 40.

At step 75 the error detected value for D2 is read from memory 36 entry A2 via path "4" by the MBIST controller 34.

At step 76 the error detected value for D1 is read from memory 36 entry A1 via path "4" by the MBIST controller 34 and stored in one of its data registers. The value read is via the indirect path which includes the read-side memory protection circuitry 40. Step 78 compares the error detected value for D1 read at step 76 with the expected error detected value. Step 80 determines whether or not these are equal. If the read value of the error detected signal and the expected value of the error detected signal are not equal, then step 82 serves to perform processing associated with a fault in the read-side detection error circuitry 40. Conversely, if the values are equal, then step 84 performs read-side protection error detection circuitry test pass processing. The test then terminates at step 72 with a restore of the original value into the memory entries under test.

Figure 5:
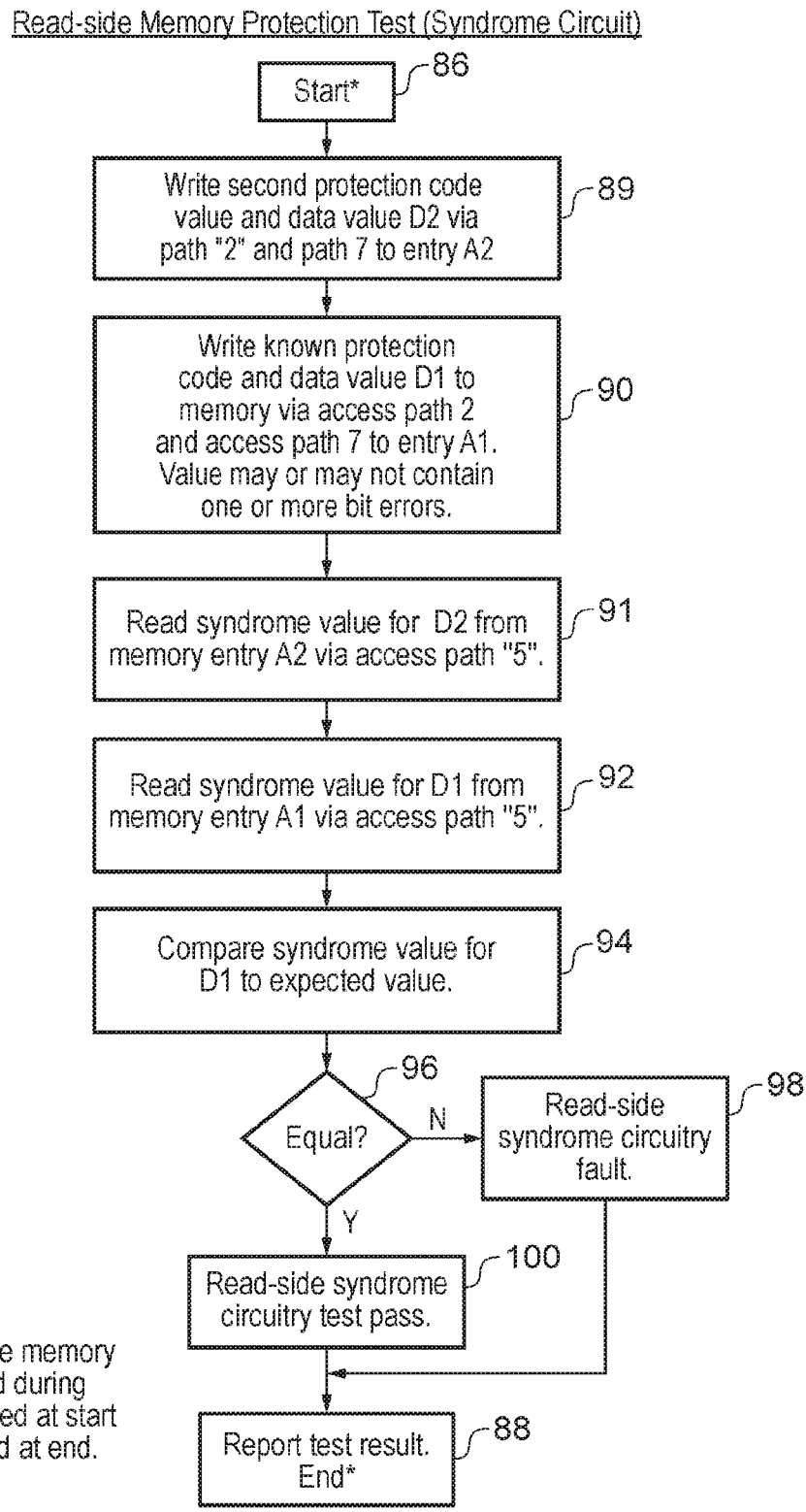
FIG. 5 is a flow diagram schematically illustrating a read-side memory protection test for detecting faults in syndrome value generation circuitry.

FIG. 5 is a flow diagram schematically illustrating a read-side memory protection test for detecting errors within the generation of a syndrome value.

The test uses a known test data value D1 and another (second) value D2 (possibly derived from the first data value D1 but with one or more inverted bits relative to the first data value D1), to rapidly stimulate the read-side memory protection circuitry with different values. One value contains an error and the other does not. Each value D1, D2 is written to a different entry (A1 and A2) and then read, back to back by the MBIST controller 34. Hence, each value stimulates a different response from the syndrome circuitry.

Steps 86 and 88 respectively start and stop the processing of the test with a save of the original values of the entries used and then a restore of the original values.

At step 89 the second protection code value 52 and the second data value 50 D2 are written to memory 36 entry A2 via path "2" (the direct protection code value path for write access to the memory 36) and path "7".

At step 90 a known protection code value 52 and data value 50 D1 are written to memory 36 entry A1 via path "2" and path "7" corresponding to the direct path. The values of the protection code 52 and the data value 50 may or may not contain one or more bit errors.

At step 91 the syndrome value for D2 is read from memory 36 entry A2 via path "5" by the MBIST controller.

At step 92, the syndrome value for D1 is read from memory 36 entry A1 via path "5" (the indirect path via the read-side memory protection circuitry 40). Step 94 compares the syndrome value for D1 read at step 92 with an expected value for the syndrome value given the protection code value 52 and the data value 50 which were written into the memory 36 at step 90 by the MBIST controller 34 and stored in one of its data registers. Step 96 determines whether the expected and read values of the syndrome values are equal. If the expected and read values are not equal, then step 98 triggers a read-side syndrome circuitry fault response. If the values are equal, then step 100 triggers a read-side syndrome circuitry test pass response. Step 88 reports the test result and ends the test processing.

Figure 6:
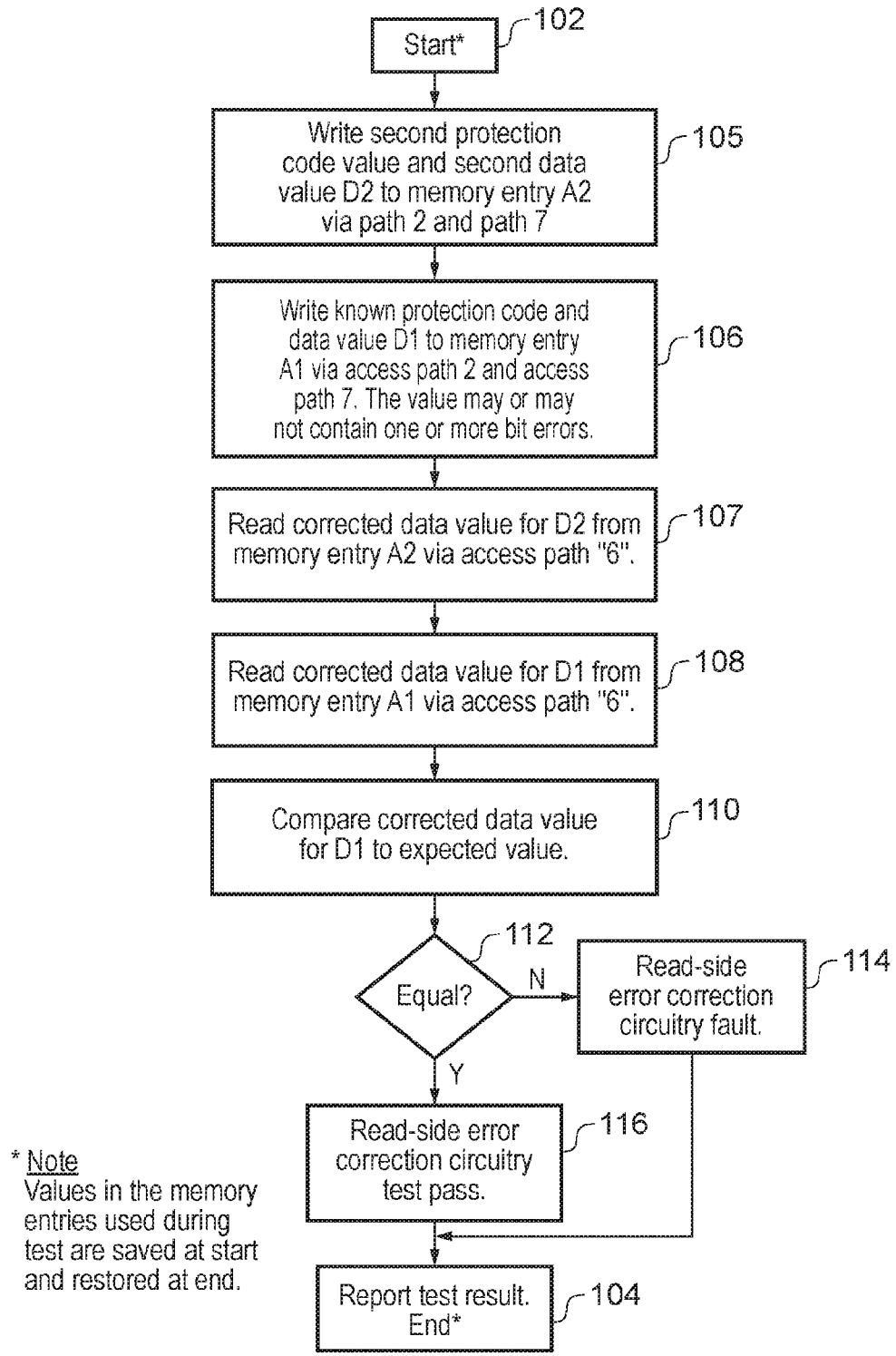
FIG. 6 is a flow diagram schematically illustrating a read-side memory protection test for detecting faults in error correction circuitry.

FIG. 6 is a flow diagram schematically illustrating a read-side memory protection test for testing error correction.

The test uses a known test data value D1 and another (second) value D2 (possibly derived from the first value D1 but with one or more inverted bits relative to the first value D1), to rapidly stimulate the read-side memory protection circuitry with different values. One value contains an error and the other does not. Each value is written to a different entry (A1 and A2) then read, back to back by the MBIST controller 34. Hence, each value stimulates a different response from the error correction circuitry. In some examples, the two values are the inverse of one another.

The testing starts at step 102 with a save of the current values of the entries used by the test within the memory 36 and ends at step 104 with the reporting of the test result and the termination of the test together with a restore of these values back into the entries.

At step 105 the second protection code value 52 and second data value 50 D2 are written to memory 36 entry A2 via path "2" and path "7".

At step 106 a known protection code value 52 and data value 50 D1 are written to memory entry A1 via path "2" (the direct protection code value access path which by-passes the write-side memory protection circuitry 38) and path "7".

At step 107 the corrected data value for D2 is read from memory 36 entry A2 via path "6" by the MBIST controller.

At step 108 the corrected data value for D1 is read from memory entry A1 via path "6" (an indirect path via the read-side memory protection circuitry 40). At step 110 the corrected data value for D1 read at step 108 is compared to the expected corrected data value by the MBIST controller 34 and stored in one of its data registers. Step 112 determines whether the read and expected values are equal. If the values are not equal, then step 114 serves to trigger a read-side error correction circuitry fault response. If the values are equal, then step 116 serves to trigger a read-side error correction circuitry test pass response. The test then terminates at step 104.

Figure 7:
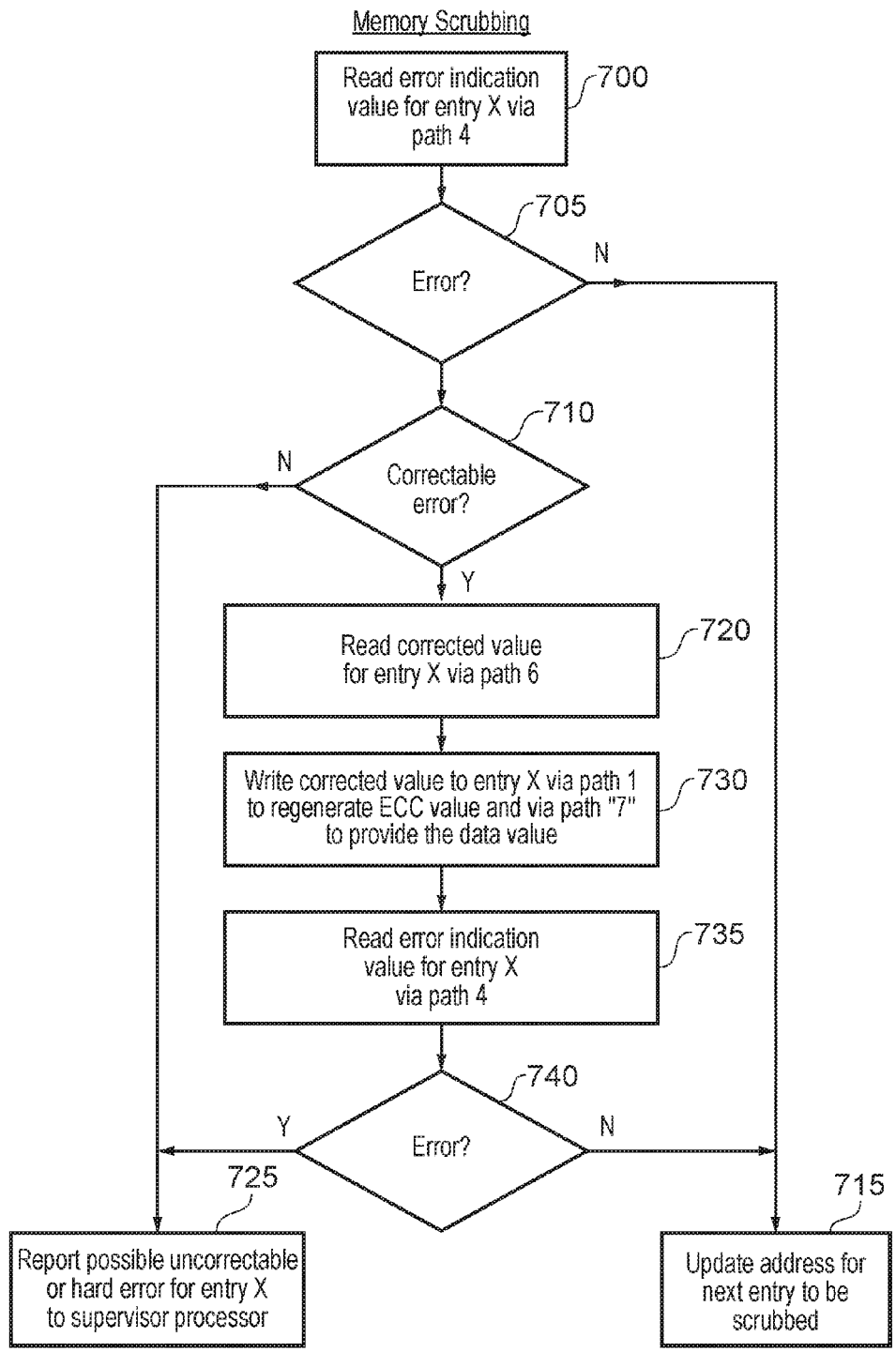
FIG. 7 is a schematic flow diagram illustrating a memory scrubbing procedure.

FIG. 7 is a flow diagram schematically illustrating the memory scrubbing procedure for one memory entry using the circuitry required for testing the memory protection circuits. This procedure is repeated for each entry within a memory 36 and may be carried out on a periodic basis during normal operation. The memory accesses are performed back to back to ensure that the memory is locked for as short a time as possible. The procedure may be repeated for several different memory entries in one go without the need to release the lock between entries.

The procedure starts at step 700 with a read of the protected data value stored in the entry (illustrated as an arbitrary entry X) being scrubbed within the memory 36 via path "4" by the MBIST controller 34. The error indication value from read-side memory protection circuitry 40 is read by and returned to the MBIST controller 34.

At steps 705 and 710 the MBIST controller 34 checks the error indication value. (Note that these are shown as separate steps for clarity of the routing of control flow in the diagram, but may be implemented as a single check with three possible outcomes: no error, correctable error, uncorrectable error). If no error is indicated, control passes to a step 715 at which the address is updated for a next entry to be scrubbed. If an error is indicated then control passes to the step 710 at which, if a correctable error is indicated, the procedure then continues to a step 720, or if not (that is to say, if an uncorrectable error is indicated), control passes to a step 725.

At the step 720 the protected data value stored in the entry being scrubbed within the memory 36 is read via the path "6" (an indirect path via the read-side memory protection circuitry 40), by the MBIST controller 34. This has the effect of reading the corrected data value.

At step 730 the MBIST controller 34 writes this corrected value back to the entry being scrubbed in memory 36 via path "1" which—as mentioned above—passes via the write side protection circuitry to generate the protection code value and path "7" for the protected data value. The write-side memory protection circuitry 38 generates a protection code value 50 and stores this into the memory 36 together with the corrected protected data value 52.

Note that the detected error could be in the data field or in the ECC field. If the error is in the data field then the ECC logic can correct the data on read and this (corrected) data is written back to memory, correcting the error. The ECC field is regenerated but is the same as before. If the error is in the ECC field then the corrected read data is the same as the value stored in memory. This value is written back to memory and the ECC field is regenerated which is different to before, correcting the error.

At step 735 the protected data value stored in the entry being scrubbed within the memory 36 is read again via path "4" by the MBIST controller 34.

At step 740 the error indication value read in the step 735 is checked by the MBIST controller 34 and if an error is indicated then the procedure continues to the step 725. If not (if no error is indicated) then control passes to the step 715 at which (as mentioned above) the memory address is updated in the MBIST controller to point to the next entry in memory 36 to be scrubbed and the procedure (in respect of that memory address) ends.

At the step 725 the MBIST controller 34 raises an alarm to the supervisor processor 35 to indicate that the entry being scrubbed contains an unrecoverable or hard error. The supervisor processor 35 may then take mitigating action: for example, it may test the entry being scrubbed in the memory 36 or reset the processor or take some other action.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus for processing data comprising:
a memory;
memory protection circuitry to provide an operational access path to said memory and protection against errors in said memory during operational use of said memory; and
memory built-in self-test circuitry to perform test operations upon said memory;
wherein said memory built-in self-test circuitry provides an indirect test access path to said memory via said memory protection circuitry and a direct test access path to said memory by-passing said memory protection circuitry.

2. The apparatus as claimed in claim 1, wherein said memory during said operational use stores at least one protected data value and an associated protection code value generated by said memory protection circuitry and dependent upon said protected data value.

3. The apparatus as claimed in claim 2, wherein said protection code value comprise one of: a parity value and an error correction code value.

4. The apparatus as claimed in claim 1, wherein said memory protection circuitry at least one of detects errors and corrects errors.

5. The apparatus as claimed in claim 2, wherein said memory protection circuitry comprises write-side memory protection circuitry to generate said associated protection code value in dependence upon said protected data value when said protected value is written to said memory during said operational use.

6. The apparatus as claimed in claim 2, wherein said memory protection circuitry comprises read-side memory protection circuitry to use said protection code value to at least one of detect an error in said protected data value and correct an error in said protected data value when said protected data value is read during said operational use.

7. The apparatus as claimed in claim 2, wherein said direct test access path permits said memory built-in self-test circuitry during said test operations at least one of:
to write to said memory a test protected data value and a test protection code value that is independent of said test protected data value; and
to read from said memory said test protected data value and said test protection code value as stored in said memory.

8. The apparatus as claimed in claim 2, wherein said indirect test access path permits said memory built-in self-test circuitry during said test operations to write via said memory protection circuitry to said memory: (i) a test protected data value and (ii) a test protection code value that is generated by said memory protection circuitry and is dependent upon said test protected data value.

9. The apparatus as claimed in claim 2, wherein said indirect test access path permits said memory built-in self-test circuitry during said test operations to read via said memory protection circuitry from said memory at least one of:
a test protected data value subject to any error correction performed by said memory protection circuitry;
a test protected data value subject as stored in said memory;
a test protection code value as stored in said memory;
an error detected value indicating that said memory protection circuitry detected that said test protection code value indicates at least one error within said test protected data value stored in said memory; and
a syndrome value indicative of one or more bit positions within said test protected data value stored in said memory at which an error was detected by said memory protection circuitry.

10. The apparatus as claimed in claim 1, comprising at least one memory access source to generate memory accesses to said memory during said operational use of said memory, wherein access to said memory by said at least one memory access source is blocked during said test operations.

11. The apparatus as claimed in claim 10, wherein said at least one memory access source continues operations that are independent of access to said memory during said test operation.

12. The apparatus as claimed in claim 1, comprising a plurality of memories subject to test operations controlled by said memory built-in self-test circuitry.

13. A method of built-in self-testing a memory having memory protection circuitry providing an operational access path to said memory and protection against errors in said memory during operational use of said memory, said method comprising:
accessing said memory using an indirect test access path via said memory protection circuitry; and
accessing said memory using a direct test access path by-passing said memory protection circuitry.

14. The method as claimed in claim 13, wherein during said operational use said memory stores at least one protected data value and an associated protection code value generated by said memory protection circuitry and dependent upon said protected data value.

15. The method as claimed in claim 14, wherein said memory protection circuitry comprises write-side memory protection circuitry to generate said associated protection code value in dependence upon said protected data value when said protected value is written to said memory during said operational use, said method comprising testing said write-side memory protection circuitry by:
writing one or more test protected data values to said memory via said indirect test access path such that said write-side memory protection circuitry generates and stores in said memory one or more respective test protection code values dependent upon said one or more test protected values;
reading via said direct test access path said one or more test protection code values stored in said memory; and
comparing said one or more test protection code values read from said memory with respective expected protection code values generated in dependence upon said test protected data value.

16. The method as claimed in claim 14, wherein said memory protection circuitry comprises read-side memory protection circuitry to use said protection code value to detect an error in said protected data value when said protected data value is read during said operational use, said method comprising testing said read-side memory protection circuitry by:
writing one or more test protected data values and one or more respective test protection codes to said memory via said direct memory access path, said one or more test protection codes having a value indicative of more or more errors in said respective test protected data;
reading said one or more test protected data values via said indirect memory access path such that said one or more test protected data values are subject to error detection by said read-side memory protection circuitry; and
determining whether an error detected value generated by said read-side memory protection circuitry indicates an error in said test protected data.

17. The method as claimed in claim 14, wherein said memory protection circuitry comprises read-side memory protection circuitry to use said protection code value to detect an error in said protected data value when said protected data value is read during said operational use, said method comprising testing said read-side memory protection circuitry by:
writing one or more test protected data values and one or more respective test protection codes to said memory via said direct memory access path, said one or more test protection code having respective values indicative of more or more errors at given positions in said test protected data;
reading said one or more test protected data values via said indirect memory access path such that said one or more test protected data values are subject to error correction by said read-side memory protection circuitry; and
determining whether said test protected data values read by said read-side memory protection circuitry indicate said given positions of said one or more errors in said test protected data.

18. The method as claimed in claim 14, wherein said memory protection circuitry comprises read-side memory protection circuitry to use said protection code value to correct an error in said protected data value when said protected data value is read during said operational use, said method comprising testing said read-side memory protection circuitry by:
writing one or more test protected data values and one or more respective test protection codes to said memory via said direct memory access path, said test protection codes having respective values indicative of one or more errors in said test protected data;

reading said test protected data via said indirect memory access path such that said test protected data value is subject to error correction by said read-side memory protection circuitry; and comparing said test protected data values read from said memory and subject to said error correction with respective expected protected data values.

19. The method as claimed in claim 14, comprising:

reading a protection code value for a stored data value via said indirect memory access path;

when the protection code value indicates an error, reading the stored data value via said indirect memory access path to provide a replacement data value and writing the replacement data value to replace said stored data value so as to cause regeneration of said protection code value; and reading the protection code value for said replaced stored data value via said indirect memory access path to confirm whether the error has been corrected.

20. Memory built-in self-test apparatus for built-in self-testing a memory having memory protection circuitry providing an operational access path to said memory and protection against errors in said memory during operational use of said memory, said memory built-in self-test apparatus comprising:

memory interface circuitry to provide an indirect test access path to said memory via said memory protection circuitry and a direct test access path to said memory by-passing said memory protection circuitry.

\* \* \* \* \*